United States Patent
Sugino et al.

(10) Patent No.: US 11,928,036 B2
(45) Date of Patent: Mar. 12, 2024

(54) RECOVERY FROM BROKEN MODE

(71) Applicant: Kioxia Corporation, Tokyo (JP)

(72) Inventors: Kentaro Sugino, San Jose, CA (US); Mahesh Bhadragiri Acharya, Bengaluru (IN); Sharwan Lal Saini, Bengaluru (IN)

(73) Assignee: Kioxia Corporation, Tokyo (JP)

( * ) Notice: Subject to any disclaimer, the term of this patent is extended or adjusted under 35 U.S.C. 154(b) by 136 days.

(21) Appl. No.: 17/709,046

(22) Filed: Mar. 30, 2022

(65) Prior Publication Data

US 2023/0315587 A1 Oct. 5, 2023

(51) Int. Cl.
*G06F 11/14* (2006.01)
*G06F 9/4401* (2018.01)

(52) U.S. Cl.
CPC ........ *G06F 11/1469* (2013.01); *G06F 9/4401* (2013.01); *G06F 2201/84* (2013.01)

(58) Field of Classification Search
CPC ..... G06F 11/14; G06F 11/1479; G06F 9/4401
See application file for complete search history.

(56) References Cited

U.S. PATENT DOCUMENTS

| | | | |
|---|---|---|---|
| 7,480,793 B1 * | 1/2009 | Marsh | G06F 11/1417 713/1 |
| 2012/0102305 A1 * | 4/2012 | Liang | G06F 9/4416 713/2 |
| 2014/0241071 A1 * | 8/2014 | Goss | G11C 7/20 365/189.05 |
| 2018/0329719 A1 * | 11/2018 | Siebenthaler | G06F 9/4416 |
| 2021/0227054 A1 * | 7/2021 | Khan | H04L 45/563 |
| 2023/0244497 A1 * | 8/2023 | Poosapalli | G06F 9/4406 713/2 |

* cited by examiner

*Primary Examiner* — Kamini B Patel
(74) *Attorney, Agent, or Firm* — Allen & Overy LLP

(57) ABSTRACT

A method of recovering a storage device from a failure mode by a controller, the method comprising executing a boot up of the storage device, determining whether an instruction for pseudo boot up of the storage device has been received, switching from the boot up to a pseudo boot up of the storage device if an instruction for the pseudo boot up has been received, and resuming operation of the storage device from the prior operational state. The pseudo boot up restores the storage device to a prior operational state up to the point in time when the storage device encountered a failure triggering event that caused the storage device to enter the failure mode.

26 Claims, 4 Drawing Sheets

RECOVERY FROM BROKEN MODE

FIELD

The present disclosure relates to methods and devices for recovering a storage device from failure mode that ensures continued operation without loss of metadata.

BACKGROUND

Over the last decade, the use of memory devices has become widespread. Such memory devices include solid-state drives (SSDs) and hard disk drives (HDDs). SSDs are non-volatile storage devices that include NAND flash memory devices. Such storage devices offer fast performance, are compact, and often include a controller to manage the operation of the device and communications with a host. Given these advantages, SSDs and HDDs are being used as the main storage device in most computing devices and consumer products. However storage devices wear out gradually over time giving rise to issues such as increased die erase times and drifting threshold voltages. This has implications on the capability of the storage device to hold information, and may lead to the random loss of data. This may cause errors when processing commands. Such errors may cause the device to hit an assert or panic, due to power loss protection (PLP) failure and overprovisioning shortage, for example.

Storage devices have capability to enter a failure mode when the device hits and assert or panic. This generally occurs when the operational parameters or metadata of the device are not within a specified range for normal operation. Once the device enters failure mode, the device is not able to return to normal operation unless the entire system metadata is wiped out and re-initialized. Effectively this reconstructs the storage device from "new" by replacing the device metadata with metadata specified by the manufacturer or vendor in the device firmware when the device is first out of box. However, the storage device has actually been used and the NAND die have been worn out from when they were first manufactured, resulting in a "new" storage device with aged die. Storage devices that have been used may have operational parameters that vary from their initial values. Thus, when the storage device is re-initialized, such historical lifelong metadata is erased, preventing the memory controller from being able to track the out of box behavior of the storage device. This impacts device qualification as it then becomes difficult to determine when the storage device requires replacement, for example.

Some storage devices have journaling capabilities where the device continuously logs its own behavior during normal mode operation. Controllers in such devices often attempt to recover the device from failure mode by replaying a previously saved journal. However, journaling is a complex process and previously saved journals often fail to play once reloaded into the firmware when a storage device is rebooted from failure mode. In such situations, when the device does not replay from a previously saved journal, there is no way to recover normal operation of the device. This poses a severe problem when recovering a storage device from failure. Thus it is desired to realize a new methodology for recovering a device from failure or broken mode with the most current system metadata prior to failure and without losing historical device data.

SUMMARY

According to an embodiment of the present disclosure, there is provided a method of recovering a storage device from a failure mode by a controller. The method comprises executing a boot up of the storage device. The method also comprises determining whether an instruction for pseudo boot up of the storage device has been received. Next the method comprises switching from the boot up to a pseudo boot up of the storage device if an instruction for the pseudo boot up has been received, the pseudo boot up restoring the storage device to a prior operational state up to the point in time when the storage device encountered a failure triggering event that caused the storage device to enter the failure mode. Finally the method comprises resuming operation of the storage device from the prior operational state.

According to another embodiment of the present disclosure, there is provided a storage device comprising a memory and a controller configured to store and retrieve data in the memory, the controller comprising firmware that manages the operation of internal processes of the storage device. The controller is configured to execute a boot up of the storage device. The controller is also configured to determine whether an instruction for pseudo boot up of the storage device has been received. Next the controller is configured to switch from the boot up to a pseudo boot up of the storage device if an instruction for the pseudo boot up has been received, the pseudo boot up restoring the storage device to a prior operational state up to the point in time when the storage device encountered a failure triggering event that caused the storage device to enter the failure mode. Finally the controller is configured to resume operation of the storage device from the prior operational state.

In some implementations, the method further comprises using debug data of the prior operational state during pseudo boot up of the storage device. In certain implementations, the debug data includes at least one of: system metadata, mapping tables, bad block lists and die erase time. In further implementations, the method further comprises storing the debug data for the prior operational state at the point in time when the device encountered the failure triggering event in the controller. In other implementations, the method further comprises periodically storing debug data for prior operational states during operation of the storage device at predetermined intervals of time up to the point in time when the storage device encountered the failure triggering event, and using the debug data for a most recent operational state prior to the point in time when the storage device encountered the failure triggering event, during pseudo boot up of the storage device.

In certain implementations, the predetermined intervals of time are set in firmware of the storage device by a vendor or manufacturer. In further implementations, the method further comprises overwriting system metadata corresponding to boot up with debug data corresponding to pseudo boot up. In other implementations, the method further comprises determining the status of a flag, the flag being set when the storage device receives the instruction to recover the storage device from the failure mode using pseudo boot up. In some implementations, the method further comprises storing the status of the flag in an internal memory of the control-ler, In certain implementations, a firmware of the controller initiates boot up of the storage device via an NVMe™ command. In further implementations, the method also comprises receiving from a host a vendor unique command (VUC) that initiates pseudo boot up of the storage device. In other implementations, the failure triggering event comprises any one of: assert, panic, crash, power loss protection (PLP) failure and over-provisioning shortage. In some implementations, the storage device comprises at least one of: a solid state drive (SSD), a NAND semiconductor memory, a journaling system, and a hard disk drive (HDD).

BRIEF DESCRIPTION OF DRAWINGS

The foregoing and other objects and advantages will be apparent upon consideration of the following detailed description, taken in conjunction with the accompanying drawings, in which like reference characters refer to like parts throughout, and in which.

DETAILED DESCRIPTION

To provide an overall understanding of the devices and methods described herein, certain illustrative embodiments will be described. Although the embodiments and features described herein are specifically described for use in connection with memory devices such as solid-state drives (SSDs) and hard disk drives (HDDs), it will be understood that all the components and other features outlined below may be combined with one another in any suitable manner and may be adapted and applied to other types of storage devices which are recovered from a failure mode.

Figure 1:
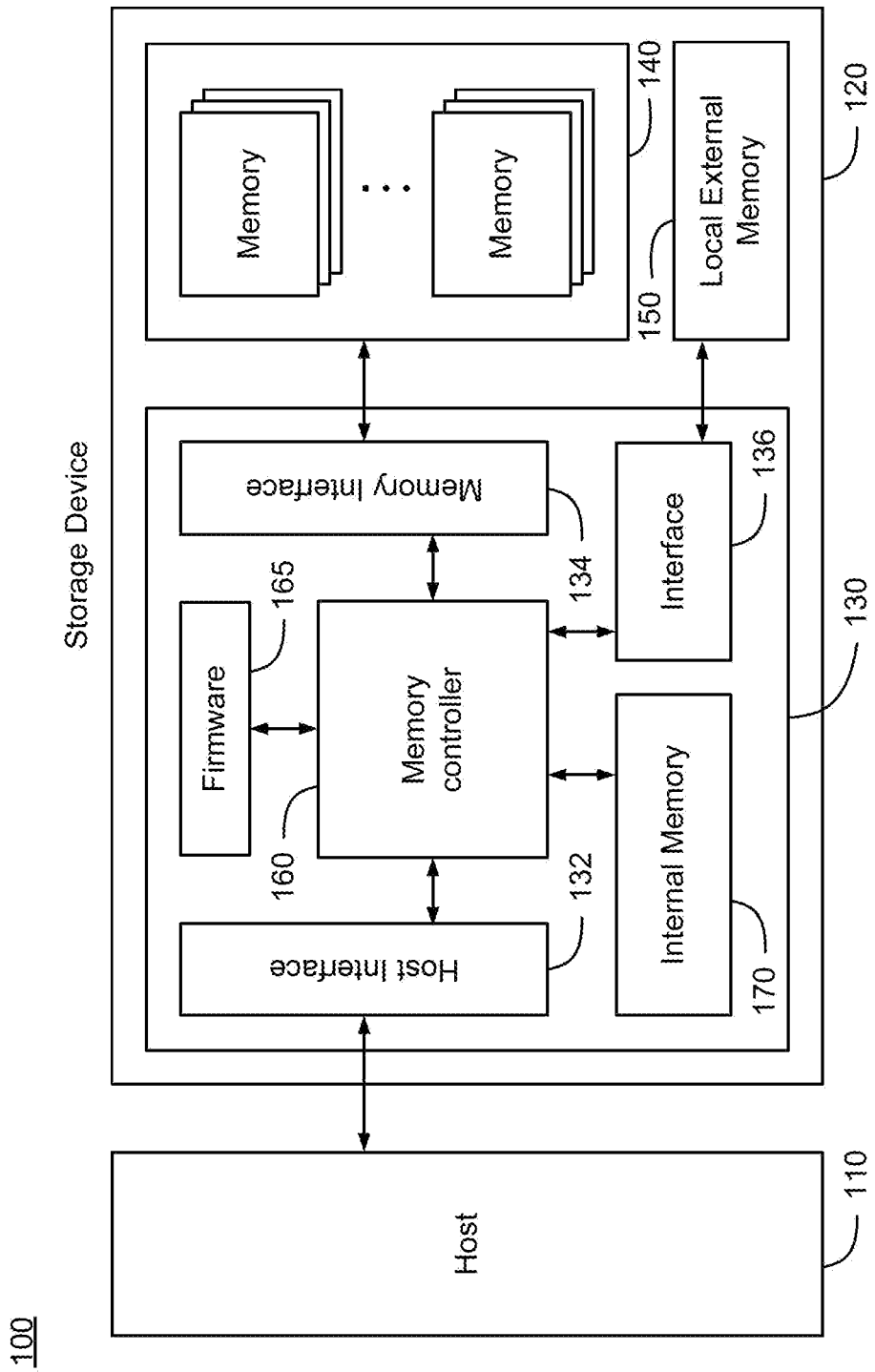
FIG. 1 illustrates a schematic representation of a storage device, configured according to one or more embodiments of the present disclosure.

FIG. 1 is a block diagram of a memory system 100 comprising at least one host 110 in communication with a storage device 120. The host 110 is a computing system that comprises processors, memories, and other components as is generally known in the art, and which is not shown in FIG. 1 for the sake of brevity. Storage device 120 provides non-volatile storage functionality for use by the host 110. Storage device 120 may include an integrated circuit comprising a controller communicatively coupled to a memory such as an SSD or HDD. Such an integrated circuit may comprise a system-on-chip (SoC) 130. SoCs are advantageous as they provide a single integrated circuit that contains all the required circuitry and components of the electronic system required for the storage device 120 to function. SoC 130 may be communicatively coupled to a memory 140. Memory 140 may comprise SSD or HDD. In the case of memory 140 comprising an SSD, the memory 140 may additionally comprise a NAND semiconductor memory, such as a NAND based flash memory device. The memory 140 may be organized into pages, blocks, planes, die and chips. Memory 140 may comprise a plurality of NAND chips, such as, for example, 32, 64, 128, 256 separate NAND chips, and each NAND chip can be running separate commands on individual die (not shown) within the chip.

Storage device 120 may include a local memory external to the SoC 130, such as a dynamic random access memory ("DRAM") 150. Local external memory 150 comprises several buffers used to buffer data during read and write operations between the host 110 and the memory 140. Further, storage device 120 may comprise a host interface 132 which enables communication with the host 110 for the receipt of I/O commands and Vendor Unique Commands (VUCs). Storage device 120 may also include a memory interface 134 for communication with the memory 140 (through a plurality of channels, not shown), and an interface 136 for communication with the local external memory 150. Interface 132, on the SoC 130 may comprise a Serial Advanced Technology Attachment (SATA) connector or a NVMe™ connector (NVMe™ is an acronym for "NVM express," where "NVM" stands for "nonvolatile memory") operating with a PCIe™ ("Peripheral Component Interface Express") bus, for example. Interface 134 may comprise an Open NAND Flash Interface (ONFI) or a manufacturer's proprietary interface, for example. Interface 136 may comprise, for example, an interface according to, but not limited to: a Double Data Rate (DDR) memory bus standard such as DDR3, DDR4 or DDR5; a Low Power Double Data rate (LPDDR) memory bus standard such as LPDDR3, LPDDR4 or LPDDR5; a Hybrid Memory Cube (HMC) memory bus standard.

Also shown in FIG. 1 is a memory controller 160 that enables the storage device 120 to perform various functions such as processing VUC commands received from the host 110 as well as internal commands generated within the storage device 120 to maintain functionality (e.g. NVMe™ commands such as 'FormatNVM'). The storage device 120 also includes a Read-Only Memory (ROM) that stores firmware 165 for the operation of various states of the storage device 120. The firmware 165 comprises computer executable instructions that are executed by the controller 160 for operation of the storage device 120. The ROM is programmed with the firmware 165 during manufacture of the storage device 120 and may be re-programmed by the controller 160 as necessary. This allows the operation of the storage device 120 to be adapted as needed. For example, the firmware 165 may contain instructions to save a flag to identify when the memory device 120 has received an instruction to recover from a failure mode so as to alter the subsequent boot up sequence of the storage device 120. The firmware 165 may also contain instructions that define the behavior of the controller 160 when in failure mode. The storage device 120 may also include an internal memory 170, such as a static random access memory ("SRAM"), that forms part of the same integrated circuit as the SoC 130. The internal memory 170 may be configured to store data such system metadata, mapping tables and bad block lists. In some embodiments, such data may also be stored in the local external memory 150

As described above, storage devices such as storage device 120 in FIG. 1, have the capability to enter a failure mode when the device encounters a failure triggering event resulting in a device assert or panic. Such failure triggering events include CPU panic, power loss protection (PLP) failure and overprovisioning shortage. Once the device enters failure mode, it will not be able to resume normal operation unless the device is re-initialized where the entire system metadata is wiped out. In most situations, after hitting an assert or panic the storage device starts a new power cycle where it powers off and on again. A storage device that has been newly manufactured also experiences similar new power cycles.

Figure 2:
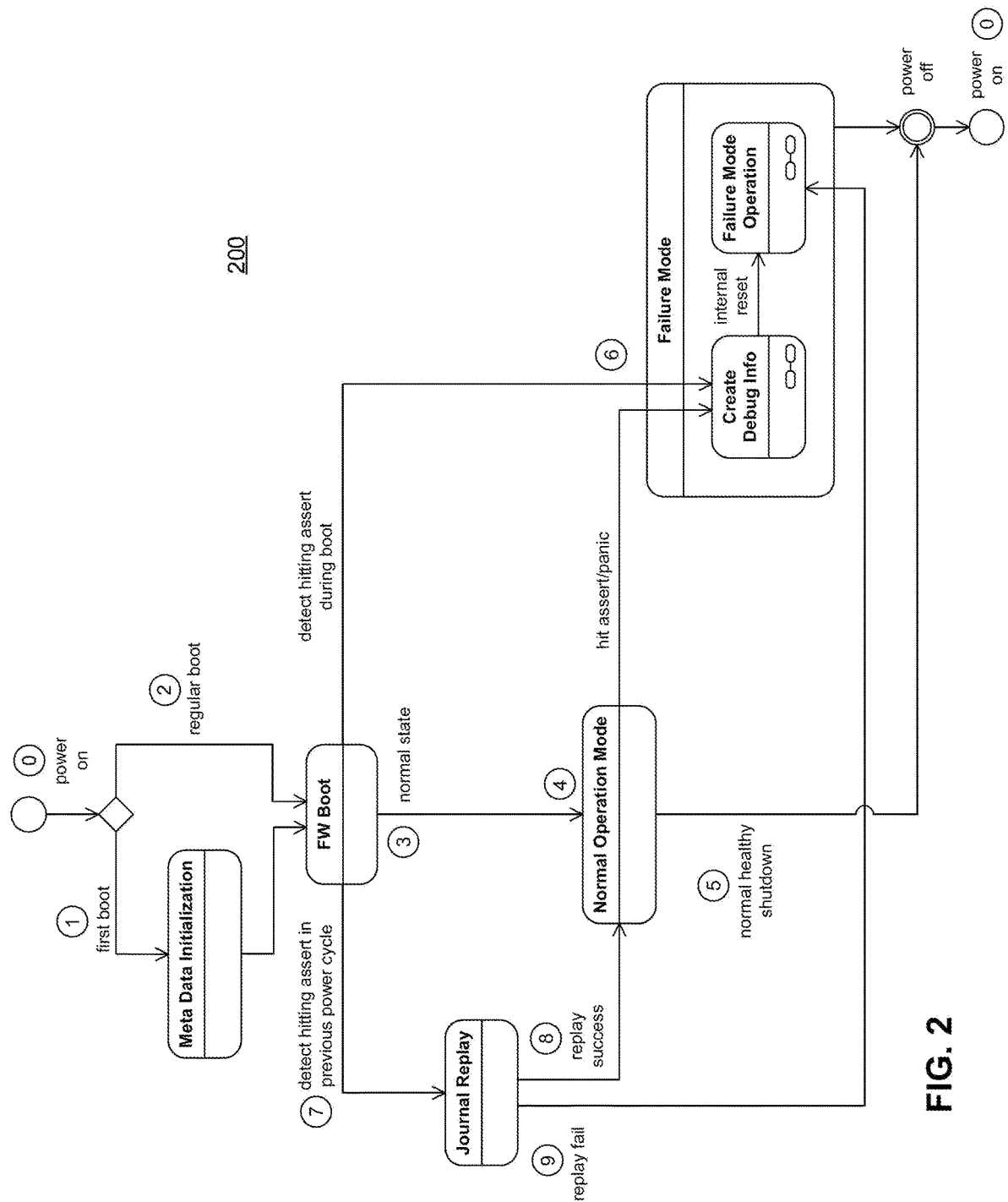
FIG. 2 shows a state transition diagram that exemplifies the various states of the storage device in FIG. 1 during typical recovery from failure mode.

FIG. 2 shows a state transition diagram 200 illustrative of a typical power up of the storage device 120.

State 0. The device may be powered up for the first time after being manufactured in a first boot out of box, or it may be powered up after a previous power off operation (e.g. due to a failure triggering event). The instruction to power on may be initiated by the controller 160 via an NVMe™ command, or by a host 110 using a VUC command transmitted to the storage device 120. Any other means of initiating power on may also be used.

State 1. If the storage device 120 is new, the controller initiates a first boot up. Here the controller 160 processes first boot up instructions in the firmware 165 where initial metadata of the storage device 120 will be initialized or created. Such metadata may be predetermined by the device manufacturer or vendor. In some implementations, the controller 160 does this by scanning for manufacturing data saved in the hardware—the internal memory 170, the local external memory 150, or the various semiconductor chips or disks in the memory 140—and then constructing initialization data. After the storage device 120 has been initialized, the controller 160 proceeds to boot up the device from the firmware 165.

State 2. If the storage device 120 is not newly out of the box and has been powered on after a previous failure mode operation, the controller 160 initiates regular/normal boot up of the device 120.

State 3. When boot up of the device is initiated, the controller 160 reads boot up instructions from the firmware 165. Such instructions may have been programmed to the ROM during manufacture or by a vendor prior to use of the storage device 120.

State 4. After booting up, the storage device 120 operates in the normal mode by processing commands received from the host 110 (e.g. read, write, etc.) or other internal commands to maintain operation of the device (e.g. error correction, garbage collection, journaling, etc.).

State 5. The storage device 120 shuts down and powers off when instructed by the controller 160, upon receipt of a command from the host 110 or a user (e.g. manual power off). This would be a healthy shutdown, which occurs most of the time in a storage device.

State 6. When the storage device 120 hits an assert or panic, the storage device 120 enters a failure mode. Here the firmware 165 has code that relate to instructions in the event of an assert of panic. These instructions include the collection of debug information/data such as device operational parameters (e.g. system metadata, mapping tables and bad block lists). The controller 160 then switches to a failure mode of operation as defined in the firmware 165. It should be noted that although the storage device 120 is in failure mode, it can still make limited communications with the host 110. Such communications may include device failure analysis commands or log retrieve commands, and associated device performance reports. After hitting an assert or panic, followed by entering the failure mode, the storage device 120 will then engage a new power cycle by powering off and powering on again, as described in States 0-2 above.

State 7. After power on, the controller 160 boots up the storage device 120 via the firmware 165. The controller 160 would detect hitting an assert in the previous power cycle and engage in journal replay. Here the controller 160 attempts to recover the storage device 120 from failure mode by using a previous normal mode of operation saved in the system journal.

State 8. If the attempt to recover the previous normal mode from the system journal is successful, the controller 160 enters the normal mode by replaying a previous state of operation from the journal information. It should be noted that some storage devices do not have a journaling system. In such devices, all metadata is usually lost during recovery from the failure mode.

State 9. However, due to the complexity of journaling in storage devices 120, the system journal information often contains errors. The journal information is especially weak in the case of semiconductor die in the corners of a plane of an SSD. If the journal information fails to replay a previous state of operation of the storage device 120, the device enters the failure mode again. The storage device 120 is therefore stuck in the loop between States 0, 1, 2, 7, 9 and power off, and there is no way to recover a normal mode.

In order to recover a normal mode of operation when the storage device is stuck in a failure mode loop, the storage device 120 will have to be re-manufactured by re-initializing the device where the entire system metadata is wiped out. Here previously accumulated debug data relating to the performance of the storage device 120 (e.g. mapping of data cells, distributions of data, etc.) will be erased and the device will be re-constructed as if it were new (State 1). This presents severe problems because the data relating to the deterioration of the components of the storage device 120 during its lifetime up to the point of re-initialization will no longer be available. This impacts the operation and performance of the storage device 120, such as, for example, the qualification process where the controller 160 or a user will not be able to determine when the device needs to be replaced.

Figure 3:
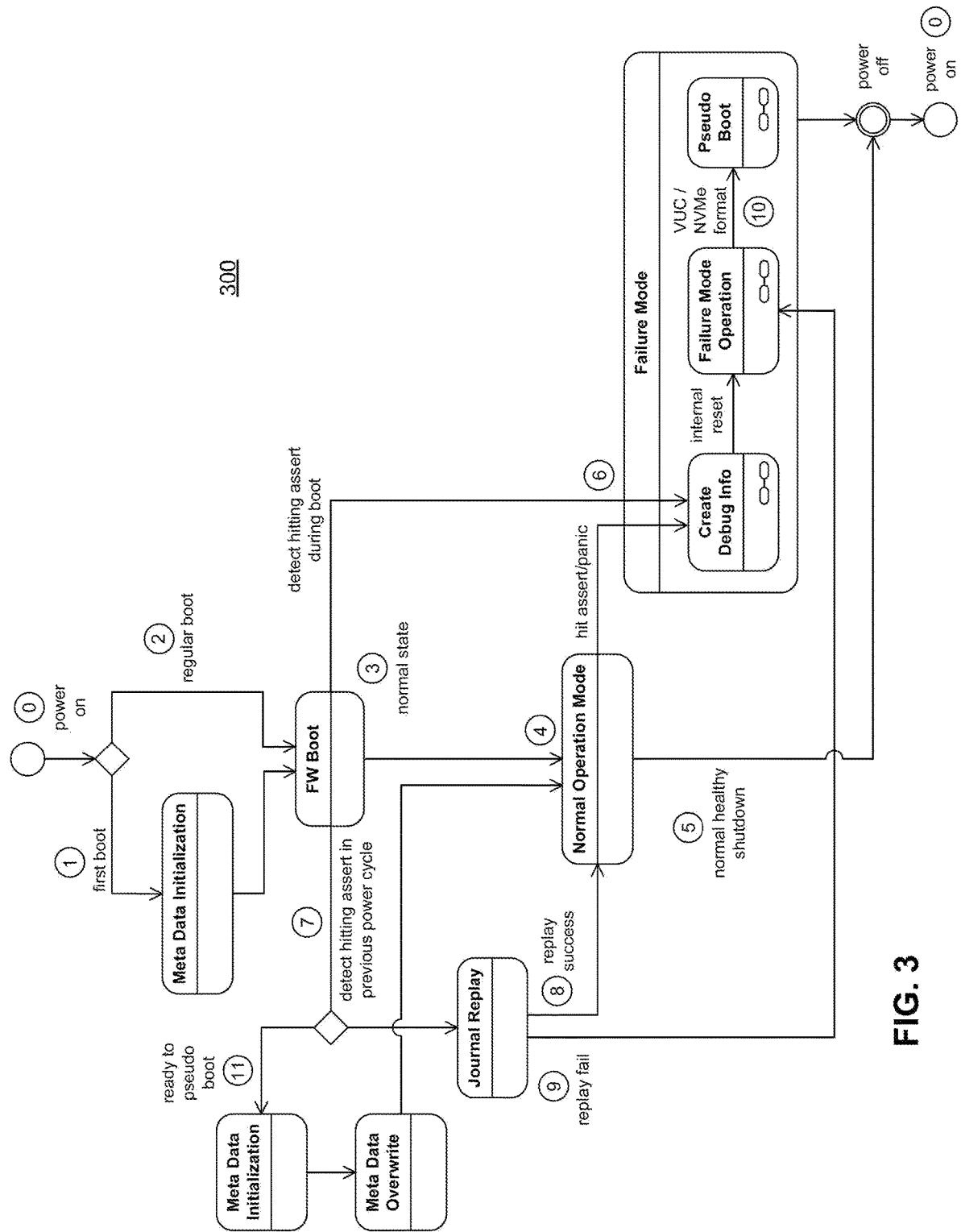
FIG. 3 shows a state transition diagram that exemplifies the various states of the storage device in FIG. 1 during recovery from failure mode using pseudo boot up, according to one or more embodiments of the present disclosure.

FIG. 3 shows a state transition diagram 300 according to an embodiment of the present disclosure. The state transition diagram 300 in FIG. 3 addresses the above issue by including a pseudo boot state. State transition diagram 300 is similar to the state transition diagram 200 in FIG. 2 with the addition of new States 10 and 11.

State 10. As previously described, when the storage device 120 enters failure mode, the storage device 120 is still able to communicate with host 110 or a user. In some embodiments of the present disclosure, the controller 120 informs the host 110 or user that the storage device 120 is entering the failure mode. In return, the host 110 may send a vendor unique command (VUC) instructing the controller 160 to boot up the storage device 120 in pseudo boot mode in the next power cycle. In other embodiments, the host 110 may send an NVMe™ command instructing the controller 160 to boot up the storage device 120 in pseudo boot mode in the next power cycle when in a failure mode. In some embodiments, a flag is set to indicate that a pseudo boot command has been issued by the host 110. The flag may be set when the controller 160 receives either the NVMe™ command or the VUC command from the host 110. The flag may also be set when the controller 160 receives any other command to indicate that the storage device 120 should boot up in pseudo boot up mode in the next power cycle. The flag may comprise a single bit that is set to '1' or cleared to '0'. The flag may be associated with the debug data collected when the storage device 120 hits assert or panic (when the device encounters the failure triggering event), prior to entering the failure mode.

State 11. When the storage device 120 is powered up again, the controller 160 initializes the metadata of the device for first boot up (as if it were a new device), and then determines whether an instruction for pseudo boot up of the storage device has been received. In some embodiments this may be done by checking the status of the flag. If the instruction for pseudo boot up has been received (i.e. the flag is set to '1'), the controller 160 overwrites the first boot up metadata with the collected debug data obtained when the device hit assert or panic in the previous power cycle. It should be understood that the debug data is very different from journaling data because the debug data is simply the metadata of the storage device 120 at a previous instance of operation. On the other hand, journaling data needs to be stored frequently as small data chunks in multiple time frames leading up to a certain point of device operation, after which complex logic is required to assemble the previous instance of operation. Journaling data is prone to inconsistencies and errors due to the variance of between the various data chunks in the journal data, whereas debug data is captures metadata in one snapshot which is simpler. Generally, debug data does not fail on playback.

As previously mentioned, the storage device 120 hits hit assert or panic when it encounters a failure triggering event. The debug data contains the most recent metadata for the storage device 120 just prior to the device hitting assert or panic. Once the metadata is loaded into the firmware 165 of the controller 160, the storage device 120 resumes operation in the normal mode, as shown in State 4. By utilizing States 10 and 11, the storage device 120 can operate in a continuous state by relying on debug data obtained when the device encountered the failure triggering event that cause entry into the failure mode. In effect, the storage device 120 takes a snap shot of the device metadata when it hits assert or panic, and triggers a pseudo boot up in the next power cycle where the first boot metadata is overwritten with the snap shot metadata. The controller 160 is able to take this snap shot of the device metadata using the power remaining in the storage device 120 at the time of hitting assert or panic. For example, if the assert or panic is caused by an internal error, the controller 160 uses the power available in the device to take the snap shot before going into the failure mode. As another example, if the assert or panic is caused by a sudden power loss, the controller 160 uses the remaining charge left in the capacitors of the storage device 120 to take the snap shot before the device enters the failure mode.

Figure 4:
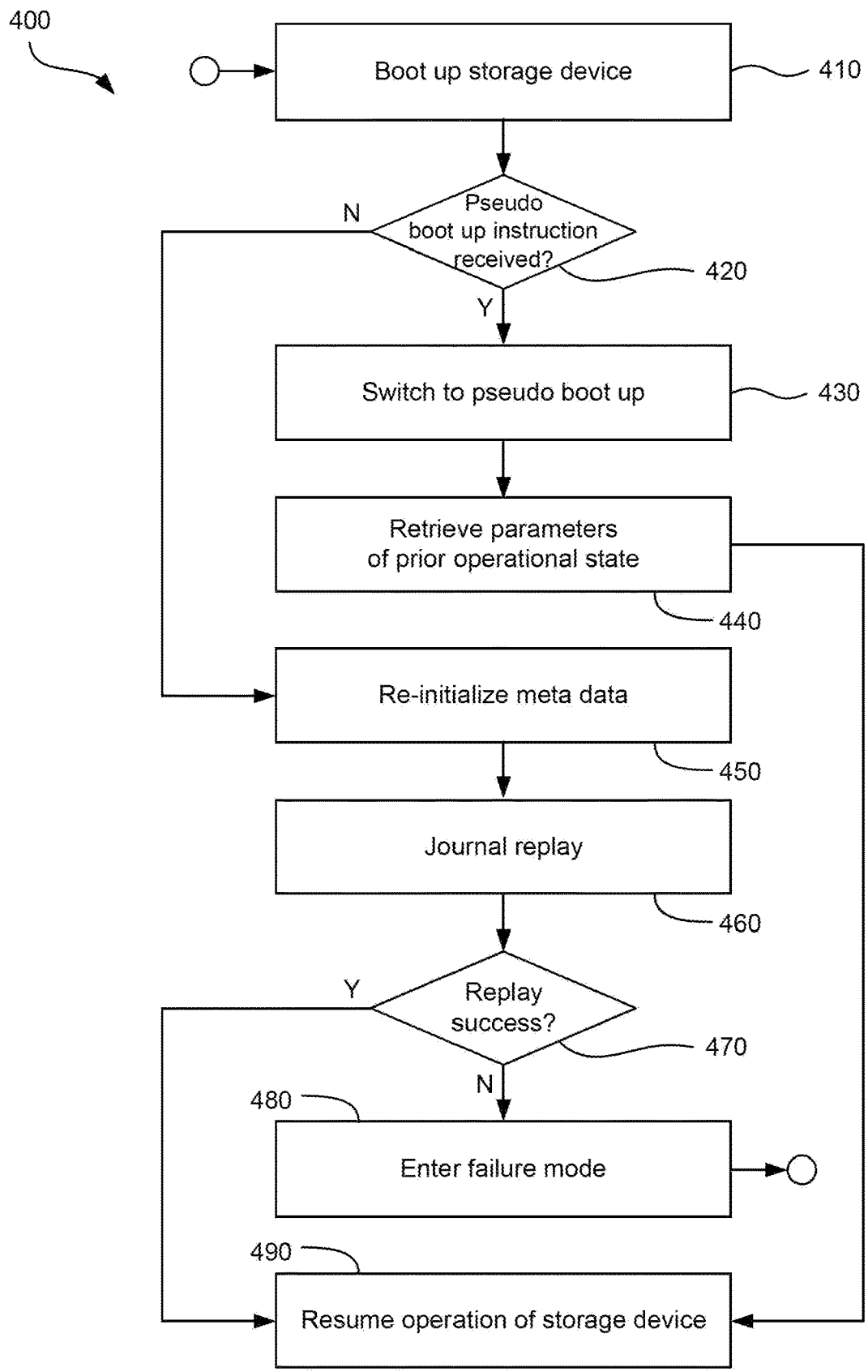
FIG. 4 illustrates an exemplary flow diagram of recovering the storage device in FIG. 1 from failure mode by using pseudo boot up, according to one or more embodiments of the present disclosure.

FIG. 4 shows an exemplary flow diagram of a method 400 for recovering the storage device 120 from failure mode, according to an embodiment of the present disclosure. The method 400 begins at step 410 where the controller 160 boots up the storage device 120 from a previous shut down caused by a failure triggering event and initializes the device. As previously described in relation to State 1 of the state transition diagram 200, when the device boots up, the controller 160 processes first boot up instructions in the firmware 165 where initial metadata of the storage device 120 will be initialized or created. Such metadata may be predetermined by the device manufacturer or vendor.

As previously described in relation to State 10 when the storage device 120 enters the failure mode, the controller 160 may inform the host 110 or user. In return, the host 110 may send a vendor unique command (VUC) instructing the controller 160 to boot up the storage device 120 in pseudo boot mode in the next power cycle. Alternatively, the firmware may contain instructions for the controller 160 to initiate an NVMe™ format command to boot up the storage device 120 in pseudo boot mode in the next power cycle. Thus after booting up the storage device 120 from failure mode in step 410, the controller 160 determines if instructions to boot up the storage device in pseudo boot mode have been received (step 420). In some embodiments, this may be achieved by checking the status of a flag that indicates whether a pseudo boot command has been issued by the host 110 or the controller 160.

If a pseudo boot instruction has been received, i.e. 'Y' at step 420, the controller 160 switches from first boot to pseudo boot (step 430). Here, the controller 160 operates in State 11 as described above where the controller 160 overwrites the first boot up metadata with the collected debug data obtained when the device hits assert or panic in the previous power cycle. The debug data contains the most recent metadata for the storage device 120 just prior to the device hitting assert or panic and may be saved in the internal memory 170 or the local external memory 150. The controller 160 retrieves the relevant debug data in step 440 and loads it into the firmware 165 so that the storage device 120 can resume operation in the normal mode (step 490). In this manner, the storage device 120 can operate in a continuous state by relying on debug data obtained when the device encountered the failure triggering event that caused entry into the failure mode. In effect, the storage device 120 takes a snap shot of the device metadata when it hits assert or panic, and triggers a pseudo boot up in the next power cycle where the first boot metadata is overwritten with the snap shot metadata.

For completeness, if a pseudo boot instruction has not been received, i.e. 'N' at step 420, the controller 160 re-initializes the metadata of the storage device 120 to the metadata for first boot as specified in the firmware 165 (step 450). Such metadata for first boot may be predetermined by the device manufacturer or vendor. After re-initialization, the storage device 120 looks and behaves like a new out of box device because all of its operational parameters have been wiped out. Here previously accumulated debug data relating to the performance of the storage device 120 (e.g. mapping of data cells, distributions of data, etc.) will be erased and the device will be re-constructed as if it were new. This is problematic because the data relating to the deterioration of the components of the storage device 120 during its lifetime up to the point of re-initialization will no longer be available. This impacts the operation and performance of the storage device 120, such as, for example, the qualification process where the controller 160 or a user will not be able to ascertain the age of the storage device 120 and thus determine when the device needs to be replaced.

In some cases, the controller 120 enters State 7 and attempts to recover a previous normal mode of operation using the system log or journal (step 460). If the controller 160 successfully replays a previous normal mode of operation, i.e. 'Y' at step 470, the controller enters State 4 and continues to operate in normal mode (step 490). However, due to the complexity of journaling in storage devices 120, the system journal information often contains errors. If the journal information fails to replay a previous state of operation of the storage device 120, the device enters the failure mode again (step 480), after which the controller 160 boots up the device again (step 410). The storage device 120 is therefore stuck in a loop and there is no way to recover a normal mode of operation.

In the foregoing, all recitation of "module" or "layer" should be taken to mean a plurality of circuits within a controller or processor that facilitates the function as described. Such circuits may comprise electronic components formed on a semiconductor chip, such as, for example, transistors and resistors. Additionally, all recitation of "storage elements," "memory," and "storage array" are used interchangeably throughout the present disclosure.

Other objects, advantages and embodiments of the various aspects of the present invention will be apparent to those who are skilled in the field of the invention and are within the scope of the description and the accompanying figures. For example, but without limitation, structural or functional elements might be rearranged consistent with the present invention. Similarly, principles according to the present invention could be applied to other examples, which, even if not specifically described here in detail, would nevertheless be within the scope of the present invention.

The invention claimed is:

1. A method of recovering a storage device from a failure mode by a controller, the method comprising:
executing a boot up of the storage device;
determining whether an instruction for pseudo boot up of the storage device has been received;
switching from the boot up to a pseudo boot up of the storage device if an instruction for the pseudo boot up has been received, the pseudo boot up restoring the storage device to a prior operational state up to a point in time when the storage device encountered a failure triggering event that caused the storage device to enter the failure mode; and
resuming operation of the storage device from the prior operational state.

2. The method of claim 1, further comprising:
using debug data of the prior operational state during pseudo boot up of the storage device.

3. The method of claim 2, wherein the debug data includes at least one of: system metadata, mapping tables, bad block lists and die erase time.

4. The method of claim 2, further comprising:
storing the debug data for the prior operational state at the point in time when the device encountered the failure triggering event in the controller.

5. The method of claim 1, further comprising:
periodically storing debug data for prior operational states during operation of the storage device at predetermined intervals of time up to the point in time when the storage device encountered the failure triggering event; and
using the debug data for a most recent operational state prior to the point in time when the storage device encountered the failure triggering event, during pseudo boot up of the storage device.

6. The method of claim 5, wherein the predetermined intervals of time are set in a firmware of the storage device by a vendor or manufacturer.

7. The method of claim 1, further comprising:
overwriting system metadata corresponding to boot up with debug data corresponding to pseudo boot up.

8. The method of claim 1, further comprising:
determining a status of a flag, the flag being set when the storage device receives the instruction to recover the storage device from the failure mode using pseudo boot up.

9. The method of claim 8, further comprising:
storing the status of the flag in an internal memory of the controller.

10. The method of claim 1, wherein a firmware of the controller initiates boot up of the storage device via an NVMe™ command.

11. The method of claim 1, further comprising:
receiving from a host a vendor unique command (VUC) that initiates pseudo boot up of the storage device.

12. The method of claim 1, wherein the failure triggering event comprises any one of:
assert, panic, crash, power loss protection (PLP) failure and over-provisioning shortage.

13. The method of claim 1, wherein the storage device comprises at least one of: a solid state drive (SSD), a NAND semiconductor memory, a journaling system, and a hard disk drive (HDD).

14. A storage device comprising:
a memory; and
a controller configured to store and retrieve data in the memory, the controller comprising firmware that manages operation of internal processes of the storage device,
wherein the controller is configured to:
execute a boot up of the storage device;
determine whether an instruction for pseudo boot up of the storage device has been received;
switch from the boot up to a pseudo boot up of the storage device if an instruction for pseudo boot up has been received, the pseudo boot up restoring the storage device to a prior operational state up to a point in time when the storage device encountered a failure triggering event that caused the storage device to enter a failure mode; and
resume operation of the storage device from the prior operational state.

15. The storage device of claim 14, wherein the controller is further configured to use debug data of the prior operational state during pseudo boot up of the storage device.

16. The storage device of claim 15, wherein the debug data includes at least one of: system metadata, mapping tables and bad block lists.

17. The storage device of claim 15, wherein the controller is further configured to store the debug data for the prior operational state at the point in time when the device encounters the failure triggering event in the controller.

18. The storage device of claim 14, wherein the controller is further configured to periodically store debug data for prior operational states during operation of the storage device at predetermined intervals of time up to the point in time when the storage device encounters the failure triggering event, and use the debug data for a most recent operational state prior to the point in time when the storage device encounters the failure triggering event, during pseudo boot up of the storage device.

19. The storage device of claim 18, wherein the predetermined intervals of time are set in a firmware of the storage device by a vendor or manufacturer.

20. The storage device of claim 14, wherein the controller is configured to overwrite system metadata corresponding to boot up with debug data corresponding to pseudo boot up.

21. The storage device of claim 14, wherein the controller is configured to determine a status of a flag, the flag being set when the storage device receives the instruction to recover the storage device from the failure mode using pseudo boot up.

22. The storage device of claim 8, wherein the controller is configured to store the status of the flag in an internal memory of the controller.

23. The storage device of claim 14, wherein a firmware of the controller initiates boot up of the storage device via an NVMe™ command.

24. The storage device of claim 14, wherein a vendor unique command (VUC) received from a host initiates boot up of the storage device.

25. The storage device of claim 14, wherein the failure triggering event comprises any one of: assert, panic, crash, power loss protection (PLP) failure and over-provisioning shortage.

26. The storage device of claim 14, comprising at least one of: a solid state drive (SSD), a NAND semiconductor memory, a journaling system, and a hard disk drive (HDD).

* * * * *